United States Patent
Liu et al.

(10) Patent No.: US 9,953,355 B2
(45) Date of Patent: Apr. 24, 2018

(54) MULTI-SIGNAL BASED SHOPPING CART CONTENT RECOGNITION IN BRICK-AND-MORTAR RETAIL STORES

(71) Applicant: Microsoft Technology Licensing, LLC, Redmond, WA (US)

(72) Inventors: Jie Liu, Medina, WA (US); Dimitrios Lymberopoulos, Kirkland, WA (US); Mohammed Shoaib, Redmond, WA (US); Michel Goraczko, Seattle, WA (US); Nissanka Arachchige Bodhi Priyantha, Redmond, WA (US); Marcel Gavriliu, Snohomish, WA (US); Suman Kumar Nath, Redmond, WA (US); Changhu Wang, Beijing (CN); Yuxiao Hu, Bellevue, WA (US); Di Wang, Redmond, WA (US); Gerald Reuben DeJean, Woodinville, WA (US); Lei Zhang, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 4 days.

(21) Appl. No.: 15/225,375

(22) Filed: Aug. 1, 2016

(65) Prior Publication Data
US 2018/0033066 A1    Feb. 1, 2018

(51) Int. Cl.
*G06Q 30/00* (2012.01)
*G06Q 30/06* (2012.01)

(52) U.S. Cl.
CPC ..... *G06Q 30/0623* (2013.01); *G06Q 30/0643* (2013.01)

(58) Field of Classification Search
CPC .............. G06Q 30/0623; G06Q 30/0643
USPC ....................................... 705/26.61
See application file for complete search history.

(56) References Cited

U.S. PATENT DOCUMENTS

| | | | |
|---|---|---|---|
| 5,287,266 A | 2/1994 | Malec et al. | |
| 5,883,968 A | 3/1999 | Welch et al. | |
| 7,646,887 B2 | 1/2010 | Goncalves et al. | |
| 7,780,081 B1 | 8/2010 | Liang | |
| 7,920,062 B1 | 4/2011 | Konstad et al. | |
| 8,950,671 B2 | 2/2015 | Chan et al. | |
| 2006/0032915 A1 | 2/2006 | Schwartz | |
| 2006/0290494 A1* | 12/2006 | O'Brien | A47F 9/046 340/568.5 |

(Continued)

FOREIGN PATENT DOCUMENTS

EP    2731067 A1    5/2014

OTHER PUBLICATIONS

Rai, et al., "Video Analytics Solution for Tracking Customer Locations in Retail Shopping Malls", In Proceedings of 17th ACM SIGKDD International Conference on Knowledge Discovery and Data Mining, Aug. 21, 2011, pp. 773-776.

(Continued)

*Primary Examiner* — Yogesh C Garg
*Assistant Examiner* — Lalith M Duraisamygurusamy
(74) *Attorney, Agent, or Firm* — Workman Nydegger

(57) ABSTRACT

Identifying products in a physical store shopping environment. The method includes, using a first detection method, identifying that a given product likely belongs to a given set of products. The method further includes, using one or more other detection methods, determining that the product is likely a specific product from the given set of products.

20 Claims, 2 Drawing Sheets

(56) References Cited

U.S. PATENT DOCUMENTS

| | | | |
|---|---|---|---|
| 2008/0052037 A1* | 2/2008 | Bodin | G06Q 10/087 |
| | | | 702/173 |
| 2008/0249793 A1 | 10/2008 | Angell et al. | |
| 2009/0017764 A1 | 1/2009 | Bonner et al. | |
| 2011/0099061 A1* | 4/2011 | Giffin | G06Q 30/02 |
| | | | 705/14.49 |
| 2012/0019393 A1 | 1/2012 | Wolinsky et al. | |
| 2012/0296751 A1 | 11/2012 | Napper | |
| 2013/0048722 A1 | 2/2013 | Davis et al. | |
| 2014/0052555 A1* | 2/2014 | MacIntosh | G06Q 20/208 |
| | | | 705/23 |
| 2015/0206121 A1* | 7/2015 | Joseph | G06Q 20/208 |
| | | | 705/23 |
| 2015/0221016 A1* | 8/2015 | Schulz | G06O 30/0633 |
| | | | 705/26.7 |
| 2016/0225056 A1* | 8/2016 | Pellow | G06Q 30/0625 |
| 2016/0260135 A1* | 9/2016 | Zomet | G06O 30/0269 |
| 2016/0371650 A1* | 12/2016 | Schmidt | G06Q 10/0836 |

OTHER PUBLICATIONS

Suryaprasad J, et al., "A Novel Low-Cost Intelligent Shopping Cart", In Proceedings of IEEE 2nd International Conference on Networked Embedded Systems for Enterprise Applications, Dec. 8, 2011, 4 pages.

Gurunathan, et al., "Object Recognition in Shopping Cart", In Proceedings of 38th IRF International Conference, Sep. 27, 2015, pp. 18-21.

"International Search Report and Written Opinion Issued in PCT Application No. PCT/US2017/044054", dated Sep. 26, 2017, 11 Pages. (MS# 359700-WO-PCT).

* cited by examiner

MULTI-SIGNAL BASED SHOPPING CART CONTENT RECOGNITION IN BRICK-AND-MORTAR RETAIL STORES

BACKGROUND

Background and Relevant Art

Though brick-and-mortar stores still dominate the retail landscape today, E-commerce has become a growing threat to traditional retailers. One of the key advantages that E-retailers have over brick-and-mortar retailers is the ability to track online shoppers' actions and shopping cart in real-time. This capability gives E-retailers opportunities to provide personalized and context aware recommendations to their customers and hence may provide them better shopping experiences and increase their basket size and customer loyalty. For instance, when an online shopper views a product or adds it to her shopping cart, other related products that she may be interested in or likely to buy together can be immediately recommended. When she wants to checkout, a single click is enough.

However, in brick-and-mortar stores, retailers do not have a good mechanism to keep track of what their customers are about to buy during their shopping trips (when it is the best time to provide recommendations) until they check out when it is often too late to effectively recommend products as individual product context is lost, the customer is no longer in a shopping state of mind, adding additional products to the shopping trip would require an inordinate amount of effort to obtain the additional products, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of identifying products in a physical store shopping environment. The method includes, using a first detection method, identifying that a given product likely belongs to a given set of products. The method further includes, using one or more other detection methods, determining that the product is likely a specific product from the given set of products.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein can use multiple different hardware sensors to determine what products are associated with a shopping cart. In particular, using multiple hardware sensors and detection methods, a more accurate determination of items associated with a shopping cart can be made. A single sensor and detection method may not provide the same accuracy as multiple sensors.

These sensors can be used to determine when products are added to, or removed from a shopping cart, what products are in a shopping cart, what products are exchanged for other products in the shopping cart, etc.

The sensors may include one or more of cameras and/or other computer vision, RF transmitters, location sensors, scales, etc., to augment shopping carts and store infrastructure to recognize products put in the shopping cart in real-time for personalized recommendations and automated self-checkout.

Thus, embodiments can combine multiple signals (e.g., location, weight, RF, vision, etc.) to provide multiple degrees of knowledge about shopping cart contents (e.g., when products are added or removed from the cart, what categories of products are in the shopping cart, product locations in the shopping cart, product instance within a category in the shopping cart, etc.)

Additionally or alternatively, embodiments may use an independently novel RF-based categorization approach to identify product characteristics and to locate products in the shopping cart.

Figure 1:
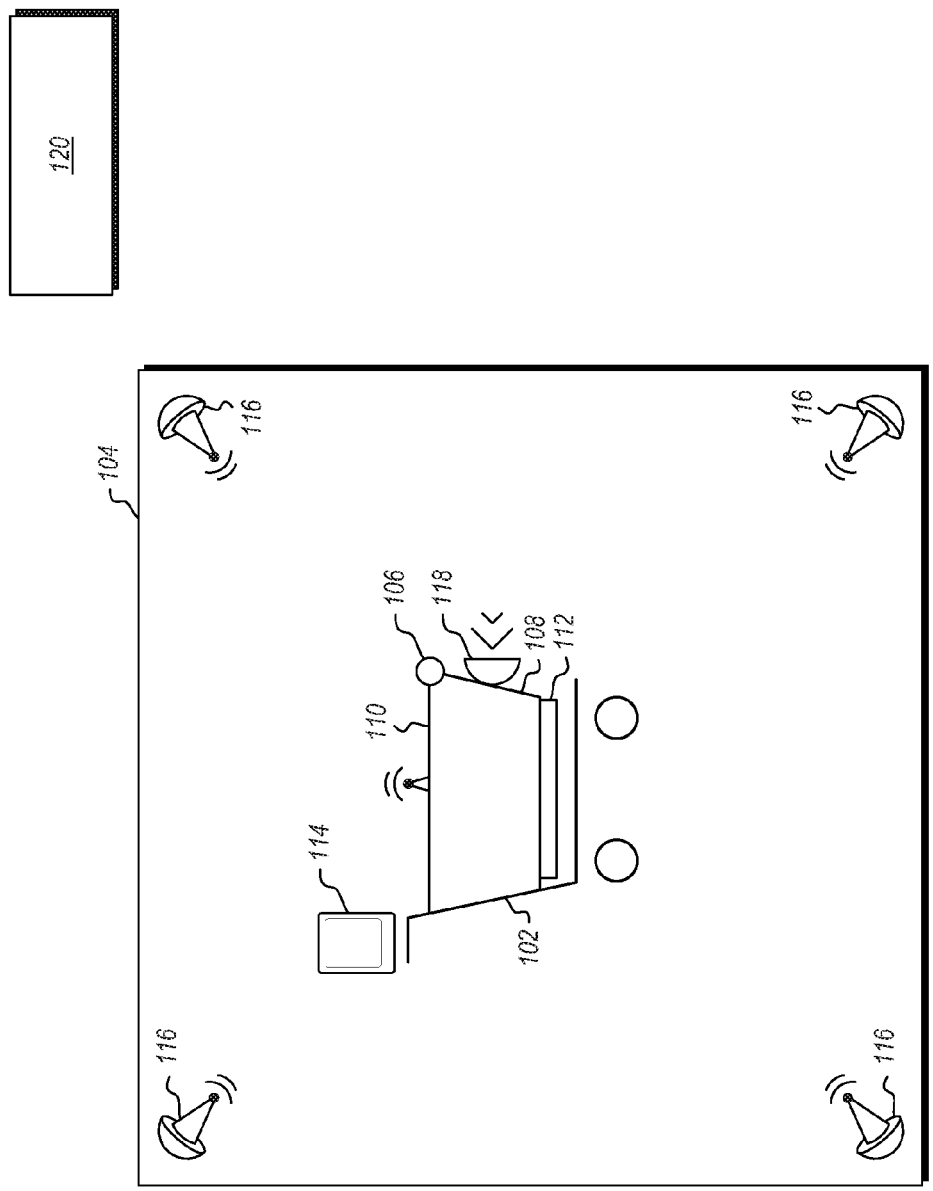
FIG. 1 illustrates a retail store environment.

Referring now to FIG. 1, an example is illustrated of a shopping cart 102 and localization infrastructure deployed in the retail store 104. The shopping cart 102 is augmented with cameras 106 at the top of the basket 108 (although the cameras could be located in other locations) of the cart 102, one or more RF transceivers 110 surrounding the basket 108 (although the antennas could be located in other locations), weight sensors 112 at the bottom of the basket 108 (although the weight sensors could be located in other locations), and a digital device 114, such as a tablet or phone at the cart 102. The digital device 114 can obtain real-time cart location, and computing data from cameras, antennas and sensors for product recognition.

In some embodiments, real time cart location information can be obtained by using transmitters 116, such as ultra-wide-band (UWB) transmitters available from companies such as decaWave of Dublin, Ireland, installed in the retail store 104 which send precise signals that can be received by a receiver 118 used to determine where the shopping cart 102 is located. In some embodiments, the retail store 104 is segregated into tiles to determine which products are to be targeted. In other embodiments, the precise signals may also be received by a digital device 114.

Embodiments may use a multi-signal approach for determining information about products associated with the cart 102. In particular, multiple different sensors may be used, each of which can be used in combination to determine products and their relationship with the cart. In particular, embodiments can determine if products are placed into the cart 102, removed from the cart 102, and/or replaced with other products. Alternatively or additionally, embodiments can determine a location of products in a cart.

Embodiments can combine knowledge from multiple sources to obtain more accurate information. Such information may include one or more of: the location of the shopping cart with respect to the store planogram, the weight of items in the shopping cart, sequentially taken photos/videos of shopping cart content, radio frequency signatures of shopping cart content, etc.

In the illustrated example, a service 120 includes information about products at the retail store 104 and information about the retail store 104 itself. For example, the service 120 may include information about how much products weigh, what the products look like, radio-wave signatures caused by and/or resulting from the products, where products are located in the retail store 104, etc. This information can be used to attempt to identify a product placed in the shopping cart 102 as is illustrated in more detail below.

The service 120 may be implemented in a number of different fashions. For example, the service 120 may be a service located at the retail store 104. Alternatively or additionally, the service 120 may be located in the cloud service accessible by computing systems at the retail store 104. Thus, the service 120 may be implemented solely at a cloud service, as an on-premise service, or some combination of the two.

Describing and/or measuring the weight of various products can be performed in a number of different ways. For example, in some embodiments, weight may be measured with high precision. In some embodiments, the weight may include weight caused by packaging.

In alternative embodiments, weight may be identified in a more coarse fashion. This can be used to generally identify a class of products rather than attempting to more precisely identify the product by weight alone. In particular, as illustrated below, various factors can be incorporated together to attempt to identify products and as such, there may be less need to have precise weights measured, such that weight can be measured in a coarse fashion, but still be used to accurately identify products.

As noted, the service 120, may also include information about product appearance. The cameras 106 can detect product appearance in the cart 102. Changes in the appearance in the products and cart 102 can be provided to the service 120 which can then attempt to identify if products have been added to or removed from a cart 102 including identifying which products have been added to or removed from the shopping cart 102.

In some embodiments, the service 120 may store a three dimensional model of various products in the retail store 104. Changes in the appearance of products in the shopping cart 102 can be compared to the various three dimensional models at the service 120 to attempt to identify which products have been added to or removed from the shopping cart 102.

In some embodiments, models of products may include a tolerance window to take into account various products which have irregular shapes over different samples of a given product. For example, the service 120 may store a model of a vegetable, such as broccoli. It should be appreciated however that all samples of broccoli are not identical in size and shape. Thus, the service 120 may have models that include certain tolerances to allow for different samples of broccoli to all be identified as broccoli. Additionally, such models may include variables to identify broccoli crowns and to distinguish them from whole stocks of broccoli.

Some embodiments may contain product modes that include one or more of various bar codes, product numbers (such as numbers identifying different fruits and vegetables) label characteristics, specialized label characteristics, such as those that may occur when a promotion on the product is being undertaken, or other product characteristics that can be used to identify various products in the retail store 104.

Some embodiments may use RF characteristics to contribute to product identification. In particular, some embodiments may store at the service 120 various RF signatures of various products at the retail store 104. For example, such signatures may include absorption, reflection, multi-path, or other RF characteristics of products at the retail store 104. In particular, the service 120 may identify how various products will react when exposed to RF frequencies and radio waves.

Each source can provide certain aspects of knowledge about the shopping cart content. For example, cart location information can be integrated with retail store planogram to map locations of products in the retail store 104. Thus, when the location of a shopping cart 102 can be determined, there is system knowledge about what products are readily available in that location. Thus, if it can be determined that a shopping cart 102 is in a particular location, and that a product has been added to the shopping cart 102, algorithms can weight products in the particular location higher in a computation to determine what product is likely being added to the shopping cart 102. Thus, for example, if the shopping cart 102 location is the frozen foods section of the retail store 104, and a product is added to the cart, frozen foods will be given a higher probability of being the product added to the shopping cart 102 as compared to, for example, dog food. In particular, embodiments may query a service 120.

Alternatively or additionally, shopping cart weight can be used to detect the addition and/or removal of a product and provide information about what product has been added and/or removed. Illustratively, if the weight sensors 112 detect an increase in weight of the products in the shopping cart 102, this is an indication that something has been added to the shopping cart 102. Alternatively, if the weight sensors 112 detect a decrease in the weight of products in the shopping cart 102, this is an indication that something has been removed from the shopping cart 102.

Additionally, the magnitude of the weight difference detected can be used to help identify which product has been added and/or removed from the shopping cart 102. In particular, the store service 120 may include data with respect to the weight of various products and their packaging. For example, if an increase of about one pound is detected, products (including packaging), having that known weight will be given a higher probability in a calculation for determining what product has been added to the shopping cart 102.

Alternatively or additionally, sequentially taken photos/videos can be used to track the visual changes of products in the shopping cart 102. These visual changes can be used in identifying specific product instances added to or removed from the shopping cart 102. For example, visual models of products at the service 120 can be compared to changes in the shopping cart 102 to attempt to identify which products have been added to or removed from the shopping cart 102.

Photos and/or videos are either taken continuously or triggered when a product is added or removed (e.g., detected by weight sensors). By looking at the sequentially taken photos/frames, embodiments can extract the key visual features/points to identify the differences and pinpoint the locations in the shopping cart where changes happened. In some embodiments, these locations can also be verified/weighted by the RF signature approach described below. In some embodiments, features may be identified using scale-invariant feature transform (SIFT). Embodiments can use the regions in the shopping cart 102 with changes to query offline trained models. For example, some embodiments may implement at the service 120 one or more deep neural network (DNN) models trained based on a variety of product images to recognize products. When doing recognition, product category inferred from the RF approach described below and cart location described above can be used to filter, limit, and/or refine the space.

Alternatively or additionally, radio waves can provide signatures of specific products and/or product categories and their locations in the shopping cart. In particular, the RF transceivers 110 can emit radio-wave use directed at products in the shopping cart 102. The transceivers 110 can detect reflections of the radio waves to determine if radio waves are absorbed, reflected, and characteristics about absorption and reflection of radio-waves directed at products in the shopping cart 102. This detected information can be compared to RF models for products stored in the service 120 to attempt to identify particular products and/or classes of products.

Thus, embodiments may use of electromagnetic signatures to facilitate identifying products. In this approach, an RF transmitting circuit can generate an electromagnetic wave with a defined power magnitude. This wave can be generated through the use of inductive coils loaded with one or more capacitors and/or with an antenna. Additionally, a receiving circuit comprising inductive coils loaded with one or more capacitors and/or an antenna may be utilized to receive the transmitted wave. In some embodiments, a transceiver containing separate radios for transmitting and receiving may include multiple antennas for transmitting and receiving but not at the same time. When a transmitting wave arrives at a receiving antenna, the power magnitude of the wave may be less than the power magnitude at the position and the point in time when the wave was transmitted. This may be due to the transmitting wave reflecting off of different geometries and surfaces at a particular frequency. By looking at a power ratio of power received at the receiving radio to the power transmitted at the transmitted radio over a band of frequencies, an electromagnetic signature may be created versus frequency. Parts of waves may be reflected, absorbed, and/or reradiated based on the geometry of an object and the types of materials that exists for the object.

In a retail environment, multiple antennas may be placed along a top portion of the basket area of a shopping cart 102. These antennas may be used to continuously transmit waves as well as receive waves. Products in stores may have different geometries and may be composed of various materials; when a wave impinges on one or more of the objects, a unique electromagnetic signature may be created over a frequency band. With these signatures, pattern recognition may be performed to identify various properties of a product. The identification may be as simple as recognizing the class of object (such as a soda can since most soda cans may be similar in geometry) and as complex as identifying a pineapple (which has a more unique shape). After pattern recognition is applied, machine learning may be utilized to train the system on the features of the signatures.

Complementing (and sometimes overlapping) pieces of information can significantly improve recognition accuracy and computation speed. For instance, on one hand, RF-based approach may only be able to identify product category, while computer vision based approach can be used to differentiate the instances within a category based on their visual differences. On the other hand, vision based approach is computationally inefficient for segmenting different products and incapable of detecting products which are hidden from cameras, but RF-based approaches can help locate products in the shopping cart and identify different categories. RF-based approaches are robust from cases where products overlap with each other. Similarly, cart location can also help identify product category or products depending on the location accuracy (though shoppers may also add or remove products in the shopping cart 102 which are not generally offered in the store 104 in locations proximate or far from their shopping cart). Weight information can provide additional information on whether new products are added or removed and hence can be used to trigger vision analysis or RF spectrum analysis, etc.

An ensemble model can use various pieces of information, such as one or more of those described above, weight them and output different levels of details about the shopping cart content. Such details may include whether a product is added or removed from the shopping cart 102, where it exists in the shopping cart 102, what category of product something added to or removed from the shopping cart is, which specific product was added to or removed from the shopping cart 102, etc.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
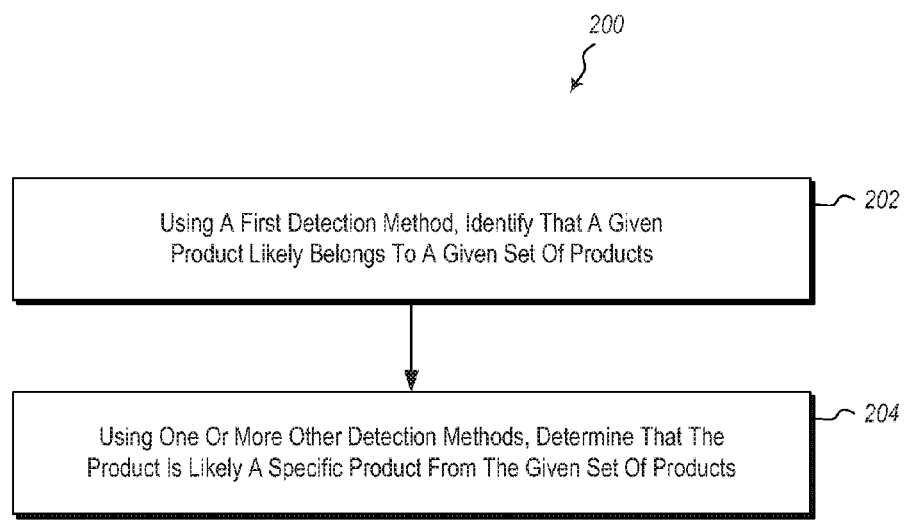
FIG. 2 illustrates a method of identifying a product.

Referring now to FIG. 2, a method 200 is illustrated. The method 200 includes acts for identifying products in a physical store shopping environment. The method 200 includes using a first detection method, identifying that a given product likely belongs to a given set of products (act 202). For example, embodiments can define generally a class of products. For example, embodiments can define a class of products that fall within a weight range. Alternatively or additionally, embodiments can define a class of products that have a particular shape. Alternatively or additionally, embodiments can define a class of products that have a particular RF signature. Alternatively or additionally, embodiments can define a class of products that have a particular packaging. Etc.

The method 200 further comprises using one or more other detection methods, determining that the product is likely a specific product from the given set of products (act 204). In particular, once a class of products is identified, embodiments can identify a specific product based on other characteristics. For example, the first detection method may be associated with weight. The second detection method could be computer vision which could identify shapes of products from among the identified set. Note that while two detection methods are illustrated here, it should be appreciated that several different detection methods can be used together. In some embodiments the detection methods may be chained with one detection method applied after another to winnow out products. Alternatively, embodiments can use different methods together to create a statistical model with the various detection methods as input used to create a probability that a given product is a particular product.

The method 200 may be practiced where the first detection method or the second detection method comprises RF signature detection. This may be used to identify product density, RF absorption, RF reflection, geometry (shape and size), the speed with which an object is placed in the cart (for example, the product is likely not pickles or eggs if it comes into the cart quickly, note that alternatively or additionally, computer vision may be used to detect this), where a product is in the cart, etc.

The method 200 may be practiced where the one or more second methods refine the first method. For example, the first method may determine a general size and the second method may determine a specific size. Alternatively or additionally, the first method may determine a general type of packaging and the second method may determine a specific type of packaging.

The method 200 may be practiced where one of the detection methods comprises computer vision, and where the computer vision identifies a location in a cart to which to zoom to identify a product.

The method 200 may be practiced where at least one of the first detection method or the second detection method includes at least one of computer vision, weight, RF signature detection, or physical location of a shopping cart.

The method 200 may be practiced where at least one of the first detection method or the second detection method includes determining that a product has been added to a cart.

The method 200 may be practiced where at least one of the first detection method or the second detection method comprises determining that a product has been removed from a cart.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry out desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising: one or more processors; and
one or more computer-readable media having stored thereon instructions that are executable by the one or more processors to configure the computer system to operate hardware sensors embedded within a physical shopping cart to identify' physical products placed into the physical shopping cart in a physical store shopping environment, including instructions that are executable to configure the computer system to perform at least the following:
use a first hardware sensor of a first sensing type, integrated with the physical shopping cart, to identify that a given physical product placed into the physical shopping cart belongs to a given set of products, wherein the given set of products comprises a sub-set of products from a larger set of products and is chosen based at least on one or more distinguishing characteristics derived by the first hardware sensor;
Use one or more different hardware sensors of a different sensing type than the first hardware sensor integrated with the physical shopping cart, to identify that a given physical product placed into the physical shopping cart belongs to a given set of products, wherein the given set of products comprises a sub-set of products from a larger set of products and is chosen based at least on one or more distinguishing characteristics derived by the first hardware sensor;
Based at least on the determination of the first sensor and the one or more different hardware sensors, prepare at least one of a personalized recommendation for additional physical products or an automated self-checkout capability.

2. The system of claim 1, wherein the first hardware sensing type comprises RF signature detection.

3. The system of claim 1, wherein the one or more different hardware sensing types refine the first hardware sensing type.

4. The system of claim 1, wherein one of the hardware detection types comprises computer vision, and wherein the computer vision identifies a location in the shopping cart to which to zoom to identify a product.

5. The system of claim 1, wherein at least one of the first hardware detection types or the one or more different hardware detecting types comprises at least one of computer vision, weight, RF signature detection, or physical location of the shopping cart.

6. The system of claim 1, wherein at least one of the first hardware detection types or the one or more different hardware detection types comprises determining that a product has been added to the shopping cart.

7. The system of claim 1, wherein at least one of the first hardware detection type or the one or more different hardware detection types comprises determining that a product has been removed from a cart.

8. A method of identifying products in a physical store shopping environment, to recommend related products to a shopper, in real time, and based on the identification of specific products placed into a physical shopping cart in a physical store, the method comprising:
using a first hardware detection sensor of a first sensing type, integrated with the shopping cart, identifying that a given physical product placed into the physical shopping cart belongs to a given set of products, wherein the given set of products comprises a sub-set of products from a larger set of products and is chosen based at least on one or more distinguishing characteristics derived by the first hardware sensor: and
using one or more ether-different hardware detection sensors of a different sensing type that the first hardware sensor, integrated with the physical shopping cart, determining that the given physical product is a specific product from the given set of products, wherein the specific product is chosen from the sub-set of products based at least on one or more distinguishing characteristics derived by the one or more second hardware sensors: and
Based at least on the determination of the first sensor and the one or more different hardware sensors, prepare at least one of a personalized recommendation for additional physical products or an automated self-checkout capability.

9. The method of claim 8, wherein the first hardware detection sensor comprises RF signature detection.

10. The method of claim 8, wherein the one or more different hardware detection sensors refine the first hardware detection sensors.

11. The method of claim 8, wherein one of the hardware detection sensors comprises computer vision, and wherein the computer vision identifies a location in the shopping cart to which to zoom to identify a product.

12. The method of claim 8, wherein at least one of the first hardware detection sensors or the one or more different hardware sensors comprises at least one of computer vision, weight, RF signature detection, or physical location of the shopping cart.

13. The method of claim 8, wherein at least one of the first hardware detection sensor or the one or more different hardware detection sensors comprises determining that a product has been added to the shopping cart.

14. The method of claim 8, wherein at least one of the first hardware detection sensor or the one or more different hardware detection sensors comprises determining that a product has been removed from the shopping cart.

15. A system for identifying products in a physical store shopping environment, the system comprising:
a shopping cart;
a first hardware sensor of a first sensing type, integrated with the shopping cart;
a second hardware sensor of a different sensing type, integrated with the shopping cart;
a mobile device integrated with the shopping cart;
a real-time recommendation system;
wherein the system is configured to use the first hardware sensor to identify that a given physical product placed in the shopping cart belongs to a given set of products, wherein the given set of products comprises a sub-set of products from a larger set of products and is chosen based at least on one or more distinguishing characteristics derived by the first hardware sensor;
wherein the system is configured to use the second hardware sensor to determine that the given physical product placed in the shopping cart is a specific product from the given set of products, wherein the specific product is chosen from the sub-set, of products based at least on one or more distinguishing characteristics derived by the one or more second hardware sensors:
Based at least on the determination of the first sensor and the one or more different hardware sensors, prepare at least one of a personalized recommendation for additional physical products or an automated self-checkout capability.

16. The system of claim 15, wherein the first hardware sensor or the second hardware sensor comprises RF sensor hardware.

17. The system of claim 15, wherein the first hardware sensor or the second hardware sensor comprises computer vision hardware.

18. The system of claim 15, wherein the first hardware sensor or the second hardware sensor comprises a scale.

19. The system of claim 15, wherein the first hardware sensor or the second hardware sensor comprises location sensor hardware.

20. The system of claim 15, wherein the system is configured to use one or more of the first hardware sensor or the second hardware sensor to determine if items have been added to or removed from the shopping cart.

* * * * *